TEMPORARY NOTICE of BEST AVAILABLE IMAGE

U. S. PATENT AND TRADEMARK OFFICE

THE SCANNED IMAGES OF PATENT NUMBER 8488 ½ X FOR THE ISSUE DATE OF 11/6/1834. ARE NOT THE COMPLETE ORIGINAL DOCUMENT, BUT CONTAIN A COPY OF THE BEST AVAILABLE TEXT AND IMAGE DATA FROM VARIOUS SOURCES.

WHEN THE MISSING INFORMATION BECOMES AVAILABLE, THE DOCUMENT WILL BE RESCANNED AND REPLACED.

ANY QUESTIONS SHOULD BE DIRECTED TO THE DATA MAINTENANCE BRANCH BY TELEPHONE AT (703) 306-3116.

TEMPORARY NOTICE of BEST AVAILABLE IMAGE

Nov. 6. 1834 217

Abial Whitman Jun^r
Letters Patent

The schedule referred to in these Letters Patent and making part of the same containing a description in the words of the said Abial Whitman Jun^r himself of his improvement in the construction of Bee Hives. To all to whom these presents shall come.
Be it known that I Abial Whitman Jun^r of Londonderry in the County of Windham in the State of Vermont have invented a new and useful improvement in the construction of Bee Hives so as to prevent millers from depositing their eggs at the entrance and the consequent destruction of bees and honey and that the following is a full & exact description of the construction of the said improvement as invented by me reference being had to the annexed drawing. A. the hive made of five pieces of boards nailed together two of which the ends should be cut to the shape of an obtuse angled triangle with the exception that they should be left 3/8 of an inch wide at the point a.a. the length from a. to b. may be three feet and from a to c. two feet & six inches & the point (the front & back) of a length to correspond with the edges of the pieces above described. and sixteen inches wide all of which being nailed together with the fifth piece B (the roof) some what longer than the end at c. b.b. will form a box in the shape of the one represented in the drawing. To support the honey in the hive. the usual method of passing rods through should be made use of. During the operation of the Bees the hive should be supported between two horizontal bars supported by parts of the rods the bars running parallel to each other and of sufficient distance apart to admit the hives to be placed between them. The size and proportion of the whole may be varied to suit the views of the constructor. The invention here claimed and for which a Patent is desired to be secured consists in admitting the Bees through the aperture at the end of the hive a.a.

11/6/1834 8488 '12X

28 a.a. as heretofore described, and without the use of a platform as heretofore used to support the hive and upon which in the filth collected at the bottom of the hive, the millers deposite their eggs.

Done at Londonderry this 8th day of October 1834

Witnesses
John Webb
Thomas T. Vial

Abial Whitman Jun

Exd.
N.G.C.

[444 w-8]